United States Patent
Shin et al.

(10) Patent No.: US 10,418,827 B2
(45) Date of Patent: Sep. 17, 2019

(54) ELECTRICITY STORAGE SYSTEM AND METHOD FOR CONTROLLING ELECTRICITY STORAGE SYSTEM

(71) Applicant: Hitachi, Ltd., Chiyoda-ku, Tokyo (JP)

(72) Inventors: Seogchul Shin, Tokyo (JP); Kohei Honkura, Tokyo (JP); Takashi Kamijoh, Tokyo (JP); Yuuji Nagashima, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/390,942

(22) Filed: Dec. 27, 2016

(65) Prior Publication Data

US 2017/0187202 A1    Jun. 29, 2017

(30) Foreign Application Priority Data

Dec. 28, 2015  (JP) .................................. 2015-255676

(51) Int. Cl.
*H02J 7/00*    (2006.01)
(52) U.S. Cl.
CPC ............ *H02J 7/0021* (2013.01); *H02J 7/007* (2013.01); *H02J 7/0068* (2013.01)
(58) Field of Classification Search
CPC ........ H02J 7/0021; H02J 7/0068; H02J 7/007; H02J 7/0091
USPC .......................................... 320/126, 150–154
See application file for complete search history.

(56) References Cited

U.S. PATENT DOCUMENTS

| 7,610,124 | B2* | 10/2009 | Wakashiro | B60K 6/485 137/260 |
| 2012/0194127 | A1* | 8/2012 | Kobayashi | B60L 11/182 320/108 |
| 2014/0009121 | A1* | 1/2014 | Saint-Marcoux | B60L 3/0046 320/150 |
| 2015/0008887 | A1* | 1/2015 | Kim | H01M 10/443 320/136 |
| 2016/0036100 | A1* | 2/2016 | Wang | H01M 10/615 320/127 |
| 2016/0359328 | A1* | 12/2016 | Hunt | H02J 3/32 |
| 2017/0207637 | A1* | 7/2017 | Sugeno | H02J 7/0021 |
| 2017/0214256 | A1* | 7/2017 | Hardy | H02J 7/0026 |

FOREIGN PATENT DOCUMENTS

| JP | 2001-231178 A | 8/2001 |
| JP | 2009-44851 A | 2/2009 |
| JP | 2013-27243 A | 2/2013 |

* cited by examiner

*Primary Examiner* — Nathaniel R Pelton
(74) *Attorney, Agent, or Firm* — Crowell & Moring LLP

(57) ABSTRACT

An electricity storage system includes: a plurality of rechargeable batteries connected in parallel; and a control unit that controls the rechargeable batteries. The control unit detects a deactivation target rechargeable battery of which charge or discharge need to be deactivated, of the rechargeable batteries, electrically separates and deactivates the deactivation target rechargeable battery from a load in a case where a charging rate of the deactivation target rechargeable battery is lower than a predetermined charging rate, and performs control such that a temperature of the deactivated rechargeable battery is within a predetermined temperature range. In this manner, it is possible to disperse ions inside a battery such that it is possible to recover performance of the battery.

10 Claims, 7 Drawing Sheets

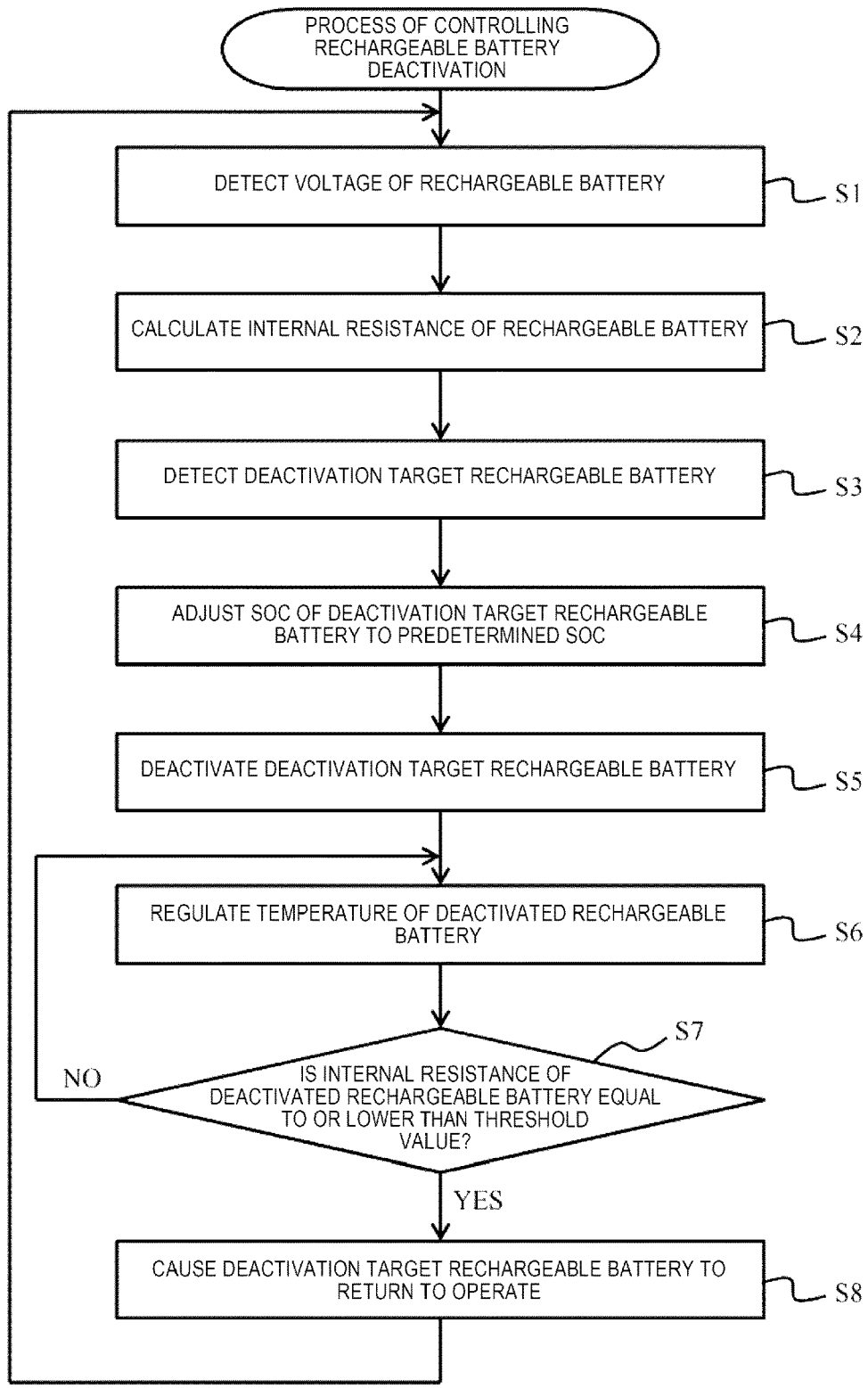

| | TEMPERATURE OF DEACTIVATED RECHARGEABLE BATTERY (°C) | SOC DURING DEACTIVATION (%) | DCR INCREASING RATE (%) | CAPACITANCE MAINTENANCE RATE (%) |
|---|---|---|---|---|
| EXAMPLE E1 | 30 | 50 | 129 | 91 |
| EXAMPLE E2 | 30 | 30 | 126 | 94 |
| EXAMPLE E3 | 40 | 50 | 125 | 90 |
| EXAMPLE E4 | 40 | 30 | 123 | 92 |
| COMPARATIVE EXAMPLE C1 | 50 | 70 | 147 | 83 |
| COMPARATIVE EXAMPLE C2 | 50 | 30 | 135 | 90 |
| COMPARATIVE EXAMPLE C3 | 30 | 70 | 132 | 89 |
| COMPARATIVE EXAMPLE C4 | 10 | 30 | 132 | 93 |
| COMPARATIVE EXAMPLE C5 | 10 | 70 | 142 | 87 |

ELECTRICITY STORAGE SYSTEM AND METHOD FOR CONTROLLING ELECTRICITY STORAGE SYSTEM

BACKGROUND OF THE INVENTION

Field of the Invention

The present invention relates to an electricity storage system and a method for controlling the electricity storage system.

Background Art

In recent years, an electricity storage system using a lithium-ion battery is proposed, in response to a growing environmental awareness. When the lithium-ion battery is continuously charged and discharged, ununiform dispersion of lithium ions progresses such that an internal resistance increases. Therefore, the lithium-ion battery has shortcomings in that a battery performance is degraded.

Ununiform dispersion of the lithium ions progresses due to variations in distribution of electrolytes in a positive electrode and a negative electrode, and generation of a region in which a sufficient battery reaction is produced and a region in which an insufficient battery reaction is produced.

JP-A-2009-44851 discloses technology that reduces degradation in a battery performance through continuous charging and discharging. JP-A-2009-44851 discloses technology in which, in a power system of an electric car including a plurality of secondary batteries which are electrically connected to a load in parallel, in a case where dischargeable electric power of each secondary battery is higher than a required output, a secondary battery having a predetermined discharge time longer than a predetermined time of the secondary batteries is deactivated not to perform discharge, and required power by the load is output from the rest of the secondary batteries. According to JP-A-2009-44851, the secondary battery is deactivated, and thereby unevenness in density of lithium ions is reduced. Thus, it is possible to have less unevenness in charges inside the battery such that it is possible to reduce degradation of the battery.

JP-A-2001-231178 discloses technology in which, in an assembled-battery control apparatus that controls an assembled battery including a plurality of secondary batteries which are connected in series, voltages of batteries are detected and capacitance is adjusted such that a difference in voltages of the batteries is small during deactivation of a battery. According to JP-A-2001-231178, capacitance adjusting means adjusts the capacitance such that the difference in voltages of the batteries is small during the deactivation when the difference is produced due to a difference between an internal resistance of the plurality of the secondary batteries and a charging current thereof during charging, and thus it is possible for the batteries to have uniform voltages, respectively.

JP-A-2013-27243 discloses technology in which battery packs connected in parallel are deactivated, and thereby degradation in cycle characteristics of batteries is reduced. JP-A-2013-27243 discloses that an electrolyte extruded from a negative electrode during charging returns to the negative electrode during deactivation, and thus variations in the electrolyte in the negative electrode, that is, variations in lithium ions, are eliminated. In JP-A-2013-27243, a deactivation time is set, and thereby uniform reactions of lithium ions in electrodes are performed such that it is possible to reduce battery degradation.

The technology disclosed in JP-A-2009-44851 is used in a power system for an electric car, and thus only discharge is controlled. However, in an industrial electricity storage system or an electricity storage system for power stabilization, not only the discharge control but also charge control needs to be performed. In addition, a state of charge (hereinafter, referred to as SOC) at the time of deactivation affects degradation of a battery; however, in JP-A-2009-44851, no attention is paid to the SOC during the deactivation and the SOC during the deactivation is not considered at all.

In JP-A-2001-231178, since an entire battery system is deactivated, a percentage (activation ratio) of batteries performing charge or discharge to the number of batteries is 0. However, in the industrial electricity storage system or the electricity storage system for power stabilization, the battery system needs to operate at a high activation rate over a long period of time such as 24 hours a day and 365 days a year. When the activation rate is lowered, operating costs of the electricity storage system are increased. Hence, it is not possible for the technology disclosed in JP-A-2001-231178 to be applied to a system in which continuous activation is required at a high activation ratio.

JP-A-2013-27243 discloses only a method for deactivating a battery pack, and a temperature of a battery during deactivation is not considered at all. In addition, in JP-A-2013-27243, the SOC during the deactivation is not completely considered.

SUMMARY OF THE INVENTION

The invention is made in consideration of problems described above, and an object thereof is to provide an electricity storage system and a method for controlling the electricity storage system in which it is possible to maintain performance of the electricity storage system. Another object of the invention is to provide an electricity storage system and a method for controlling the electricity storage system in which it is possible to improve a service life and performance and an activation rate of the electricity storage system.

In order to solve the problems described above, an electricity storage system according to the invention includes: a plurality of rechargeable batteries connected in parallel; and a control unit that controls the rechargeable batteries. The control unit detects a deactivation target rechargeable battery of which charge or discharge need to be deactivated, of the rechargeable batteries, electrically separates and deactivates the deactivation target rechargeable battery from a load in a case where a charging rate of the deactivation target rechargeable battery is lower than a predetermined charging rate, and performs control such that a temperature of the deactivated rechargeable battery is within a predetermined temperature range.

According to the invention, since the deactivation target rechargeable battery is controlled to be electrically separated at the predetermined charging rate from the load and to be deactivated so as to have the temperature within the predetermined temperature range, it is possible to reduce variations in ions in the battery. As a result, it is possible to improve a service life and performance of the rechargeable battery.

BRIEF DESCRIPTION OF THE DRAWINGS

FIG. 2 is a flowchart illustrating a process of controlling deactivation of a rechargeable battery.

DETAILED DESCRIPTION OF THE INVENTION

Hereinafter, an embodiment of the invention will be described in detail with reference to the figures. An electricity storage system of the embodiment can use, for example, a lithium-ion battery. As will be described below, an electricity storage system 1 according to the embodiment includes a plurality of battery packs 10A, 10B, . . . , and 10N which are connected in parallel, and an electricity storage system control unit 17 controls the battery packs 10A to 10N. The electricity storage system control unit 17 can control switches 11A to 11N individually which are provided between the battery packs 10A to 10N and an external load 2A or a power source 2B.

The electricity storage system control unit 17 detects, as a deactivation target battery pack, a battery pack having a temperature higher than an average temperature of battery packs that perform charge or discharge. The electricity storage system control unit 17 electrically separates the deactivation target battery pack from the load 2A and the power source 2B, and then perform control such that the temperature of the deactivation target battery pack is within a predetermined temperature range (for example, 25° C. to 40° C.). Note that it is desirable that the SOC at the time of the deactivation is lower than a predetermined charging rate (for example, 60%).

The battery pack is deactivated in conditions in which the battery pack has a charging rate lower than the predetermined charging rate and a temperature within the predetermined temperature range, and thereby it is possible to disperse lithium ions in a battery and it is possible to reduce unevenness thereof. As a result, it is possible to recover performance of the battery pack such that it is possible to prolong a service life thereof. Hereinafter, the electricity storage system of the embodiment will be described in detail.

Example 1

Figure 1:
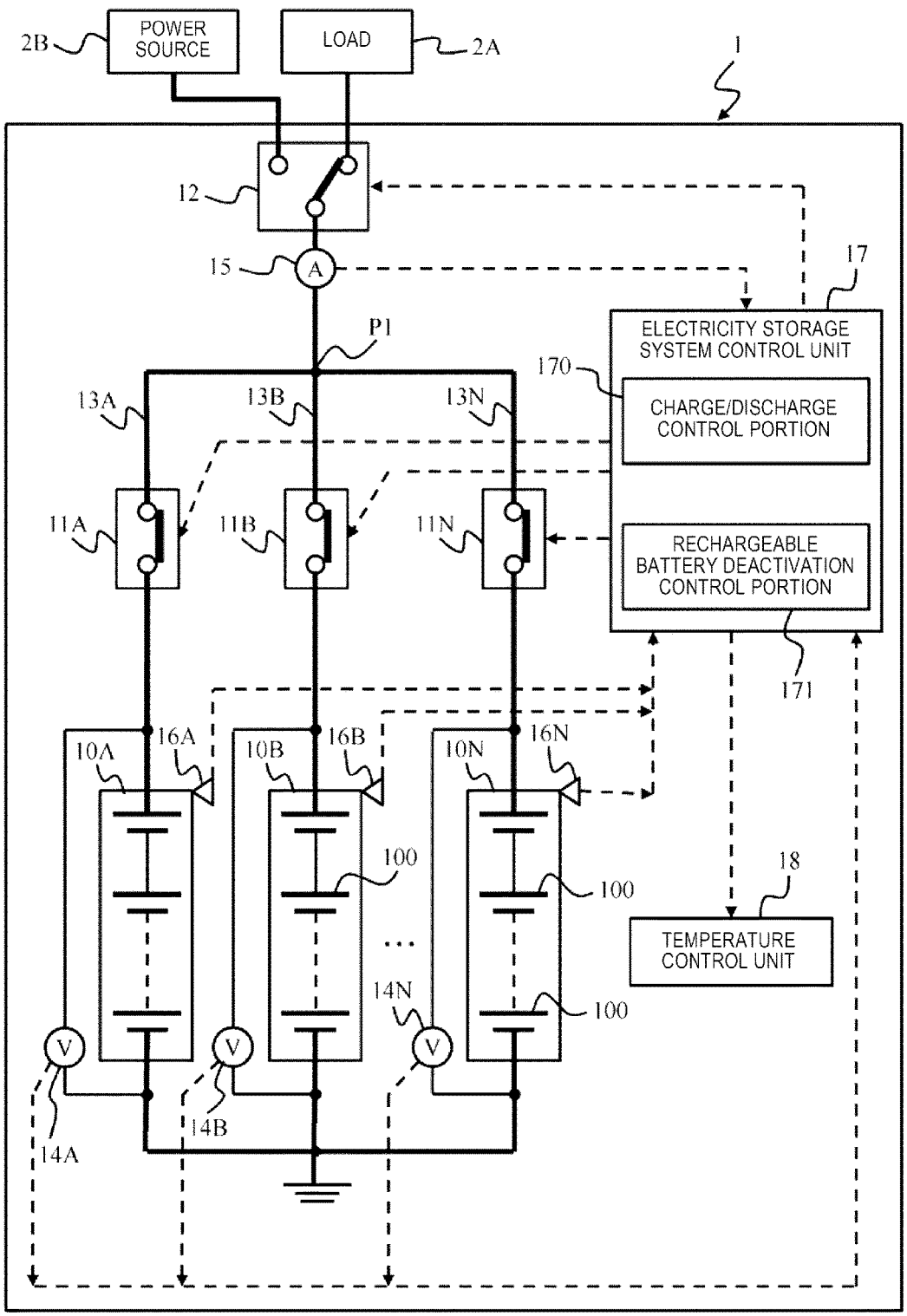
FIG. 1 is a diagram illustrating an entire configuration of an electricity storage system.

FIG. 1 is a diagram illustrating an entire configuration of the electricity storage system 1. The electricity storage system 1 is electrically connected to the load 2A or the power source 2B and performs charge or discharge. An example of the load 2A includes an industrial electrical device such as an electric motor, a household electrical device such as a lighting device, an air conditioner, a solenoid, or the like. An example of the power source 2B includes a dispersed power system such as solar power generators or wind power generators. The electricity storage system 1 performs charge from or discharge to an electric power system that is controlled by a power transmission and distribution service provider, thereby making it possible to contribute to maintaining electric power quality such as a voltage or a frequency of the electric power system. The load 2A and the power source 2B correspond to a "load". The load 2A and the power source 2B are abbreviated to a load or the-like 2 in a case where the load and the power source are not particularly distinguished. The electric power system described above corresponds to an example of the load or the-like 2.

The electricity storage system 1 includes the battery packs 10A to 10N, the switches 11A to 11N, change-over switches 12, power lines 13A to 13N, voltage sensors 14A to 14N, a current sensor 15, temperature sensors 16A to 16N, the electricity storage system control unit 17, and a temperature control unit 18. Hereinafter, letters of the English alphabet in the reference signs are omitted in a case where the members of the electricity storage system are not particularly distinguished and the members are described as the battery pack 10, the switch 11, the power line 13, the voltage sensor 14, and the temperature sensor 16.

The battery pack 10 is an example of a "rechargeable battery". The battery packs 10 individually include one or more battery cells 100. The battery cell 100 is configured of, for example, a lithium-ion battery cell. In the battery pack 10, the battery cells 100 may be connected in series or groups formed of a plurality of battery cells 100 connected in series may be connected in parallel. A plurality of battery packs 10 may be connected to the load or the-like 2 in parallel. Note that the battery pack 10 does not need to be the lithium-ion battery and may be a type of secondary battery which is preferably deactivated at a predetermined SOC and at a predetermined temperature.

The switches 11 performs an opening/closing operation in response to a control signal from the electricity storage system control unit 17, the battery packs 10 and the loads or the-like 2 are electrically connected to each other or are disconnected from each other. The battery packs 10 are individually connected to the loads or the-like 2, respectively, via the switches 11.

The change-over switch 12 performs a change-over operation in response to a control signal from the electricity storage system control unit 17, and the battery packs 10 are connected to the load 2A or are connected to the power source 2B. The power line 13 is an electric wire that electrically connects the battery packs 10.

The voltage sensor 14 measures voltages at both ends of the battery packs 10, and outputs a signal of the measurement to the electricity storage system control unit 17. The voltage sensor 14 may also be referred to as a "voltmeter" or "voltage detecting means".

The current sensor 15 measures a current that flows between the battery packs 10 and the loads or the-like 2, and outputs a signal of the measurement to the electricity storage system control unit 17. For example, the current sensor 15 is provided between a connecting point P1 of the battery packs 10 on a plus side and the change-over switch 12. If necessary, a configuration, in which the current sensors are connected to the battery packs 10, respectively, and currents which are charged to or are discharged from the battery packs 10 are directly detected, may be employed.

The temperature sensors 16 measure temperatures of the battery packs 10, and output signals of the measurements to the electricity storage system control unit 17. The temperature sensors 16 measure surface temperatures of the battery packs 10 or ambient temperatures in the vicinities of the battery packs 10. Note that, a plurality of types of sensors may be configured to be integral in the same package as in a case where the temperature sensor 16 and the voltage sensor 14 are configured to be integral.

The electricity storage system control unit 17 controls an operation of the electricity storage system 1. The electricity storage system control unit 17 includes a charge/discharge control portion 170 as a function of the operation and a rechargeable battery deactivation control portion 171. The charge/discharge control portion 170 controls discharge of supplying, to the load 2A, a current discharged from the battery packs 10 and controls charge of charging the battery packs 10 with a current from the power source 2B.

The rechargeable battery deactivation control portion 171 detects a deactivation target battery pack 10 from the battery packs 10, stops a charge/discharge operation thereof, and deactivates the battery pack. The deactivation control will be described in detail with reference to FIG. 2.

The temperature control unit 18 is a device for performing control such that a temperature of the deactivation target battery pack 10 is within a predetermined temperature range. An example of the temperature control unit 18 will be described below with reference to FIGS. 3A to 3C. As will be described in FIGS. 3A to 3C, the temperature control unit 18 causes the temperature of the deactivated battery pack 10 to be maintained within a predetermined temperature range by using heating of at least some battery packs of the battery packs 10 in the charge/discharge operation. By comparison, the temperature of the deactivated battery pack 10 may be maintained in the predetermined temperature range by using an air conditioner, a heater, or the like.

FIG. 2 is a flowchart illustrating a process of detecting and deactivating the deactivation target battery pack from a group of the battery packs 10. The rechargeable battery deactivation control portion 171 performs the process. It is possible to automatically perform the process at a predetermined cycle. Otherwise, the process may be performed in response to an instruction from an operator or may be performed whenever a battery pack 10 that needs to be deactivated is found.

For the first time, the rechargeable battery deactivation control portion 171 detects voltages of the battery packs 10 on the basis of the measurement signal from the voltage sensors 14 (S1). More specifically, the corresponding switches 11 are on, and thus the rechargeable battery deactivation control portion 171 detects voltages of the battery packs 10 in which the charging or the discharging is performed. The battery pack 10 in which the charging or the discharging is performed can be referred to as an activating battery pack 10. Note that, when the switches 11 are on, the loads or the-like 2 and the battery packs 10 are electrically connected to each other. When the switches 11 are off, the loads or the-like 2 and the battery packs 10 are electrically disconnected from each other.

The rechargeable battery deactivation control portion 171 calculates a direct current resistances (DCR) of the battery packs 10 on the basis of the voltages at both ends of the battery packs 10 and a current value detected by the current sensor 15 (S2).

The rechargeable battery deactivation control portion 171 detects, as a "deactivation target rechargeable battery", a battery pack having the highest direct current resistance from the battery packs 10 (S3). Since the battery packs 10 are the same standardized products, variations in the direct current resistance of the battery packs 10 are maintained within a tolerance in usual cases. The direct current resistance within the tolerance is substantially the same direct current resistance.

However, when lithium ions are unevenly dispersed in the battery cell 100 due to a long-term use as in continuous charge and discharge, an internal resistance increases. As a result, the battery pack 10 having the performance reduced due to the unevenness in the lithium ions has the direct current resistance higher than direct current resistances of the other battery packs 10. Thus, in the example, the battery pack 10 having a higher direct current resistance is selected as the deactivation target (S3).

In the example, the battery pack having the highest direct current resistance is selected as the deactivation target battery pack; however, the selection is not limited thereto, and, for example, a predetermined direct current resistance may be set, and a battery pack having a direct current resistance higher than the predetermined direct current resistance may be selected as the deactivation target battery pack. The predetermined direct current resistance can be set, based on an average value of the direct current resistances of the battery pack 10 or the like. Otherwise, time changes in the direct current resistances of the battery packs 10 may be recorded, and a predetermined direct current resistance may be calculated as a reference for selecting a deactivation target battery pack on the basis of the recording.

The rechargeable battery deactivation control portion 171 detects the SOC of the deactivation target battery pack 10 selected in Step S3, and adjusts the detected SOC to a predetermined SOC (S4). Here, since the SOC of the battery pack 10 is proportional to the voltages at both ends of the battery pack 10 on the both ends, the voltages on the both ends may be used instead of the SOC.

In Step S4, the rechargeable battery deactivation control portion 171 changes the switches 11 and 12 and charges or discharges the deactivation target battery pack 10 such that the SOC of the deactivation target battery pack 10 becomes the predetermined SOC. Here, an example of the predetermined SOC can be set to, for example, 60%, which will be described below in FIG. 4.

The rechargeable battery deactivation control portion 171 connects the deactivation target battery pack 10 to the load 2A such that the deactivation target battery pack is discharged, and the SOC of the deactivation target battery pack 10 is lowered to the predetermined SOC. Otherwise, the rechargeable battery deactivation control portion 171 connects the deactivation target battery pack 10 to the power source 2B such that the deactivation target battery pack is charged, and the SOC of the deactivation target battery pack 10 is raised to the predetermined SOC. Alternatively, the rechargeable battery deactivation control portion 171 may maintain a current state during the activation of the battery packs 10 until the SOC (or the voltages) of the deactivation target battery pack is equal to the predetermined SOC (or voltages).

Note that FIG. 1 illustrates a circuit in a simplified manner; however, it is preferable that the electricity storage system 1 be configure to adjust the SOC of the deactivation target battery pack 10 without stopping of the charging from and discharging to the load or the-like 2. In this case, a circuit for adjusting the SOCs of the battery packs 10 individually may be connected to the battery packs 10. Otherwise, in a case where a time zone such as the middle of the night in which it is possible to stop the electricity storage system 1, it is possible to deactivate the deactivation target battery pack 10 in the time zone.

When the SOC of the deactivation target battery pack 10 is checked to reach the predetermined SOC, the rechargeable battery deactivation control portion 171 deactivates the deactivation target battery pack 10 (S5). Specifically, the rechargeable battery deactivation control portion 171 turns off the switch 11 corresponding to the deactivation target battery pack 10 such that the deactivation target battery pack 10 is electrically separated (S5).

The rechargeable battery deactivation control portion 171 performs control such that a temperature of the deactivated battery pack 10 is within the predetermined temperature range, and maintains the temperature (S6). Here, an example of the predetermined temperature range is set to, for example, a range of 25° C. to 40° C., which will be described below in FIG. 4.

The rechargeable battery deactivation control portion 171 measures the voltage of the deactivated battery pack 10 again, using the corresponding voltage sensor 14, calculates the direct current resistance of the deactivated battery pack 10 on the basis of the voltage value, and determines whether the direct current resistance is equal to or lower than a threshold value which is used to cancel the deactivating state (S7). Note that a configuration, in which a resistance sensor for measuring and outputting the direct current resistances of the battery packs 10 is provided in addition to the voltage sensor 14, may be employed.

When the rechargeable battery deactivation control portion 171 determines that the direct current resistance of the deactivated battery pack 10 is not equal to or lower than the threshold value (NO in S7), the process returns to Step S6, and the temperature of the deactivated battery pack 10 is maintained.

When the rechargeable battery deactivation control portion 171 determines that the direct current resistance of the deactivated battery pack 10 is equal to or lower than the threshold value (YES in S7), the deactivation of the deactivated battery pack 10 is cancelled, and the battery pack returns to operate in the electricity storage system 1 (S8). In other words, the rechargeable battery deactivation control portion 171 changes the switch 11 corresponding to the deactivated battery pack 10 from off to on, the battery pack 10 and the load or the-like 2 are electrically connected, and the battery pack returns to a chargable/dischargable state.

According to the example having such a configuration, since the deactivation target battery pack 10 is deactivated in conditions of the predetermined SOC and the predetermined temperature range, it is possible to promote diffusion of the lithium ions in the battery pack 10 and it is possible to recover battery performance. Thus, it is possible to reduce an increase in the direct current resistance (DCR) occurring in the case where the battery pack 10 is continuously activated such that it is possible to improve the service life and the performance of the battery pack 10.

In the example, since the deactivation target battery pack 10 is deactivated in the predetermined conditions of the predetermined SOC and the predetermined temperature range, it is possible to promote diffusion of the lithium ions such that it is possible to recover the performance of the battery pack 10 in a relatively short deactivation time, compared to a case where the deactivation target battery pack is not used in the predetermined conditions.

Figure 3A:
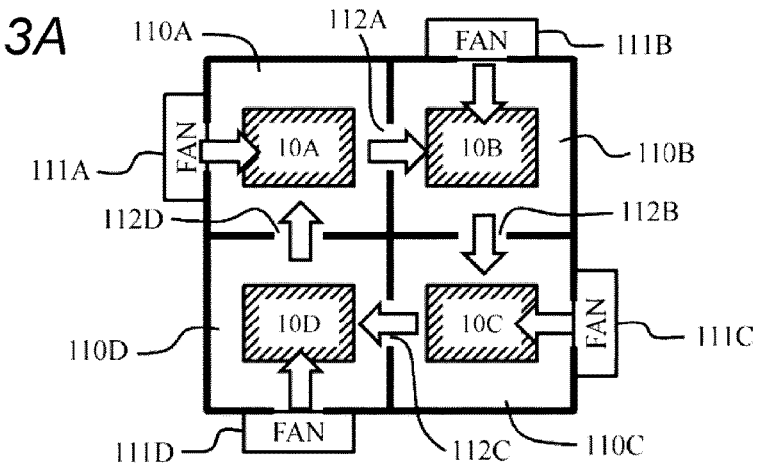
FIGS. 3A to 3C are diagrams schematically illustrating a method for controlling a temperature of a rechargeable battery during deactivation.
Figure 3B:
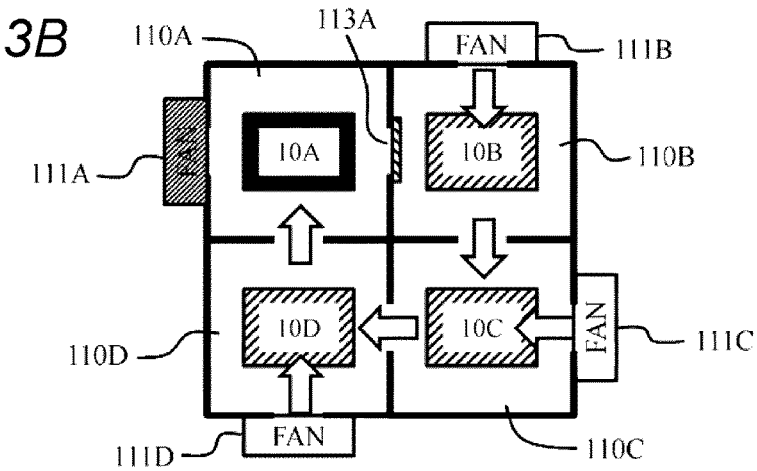
Figure 3C:
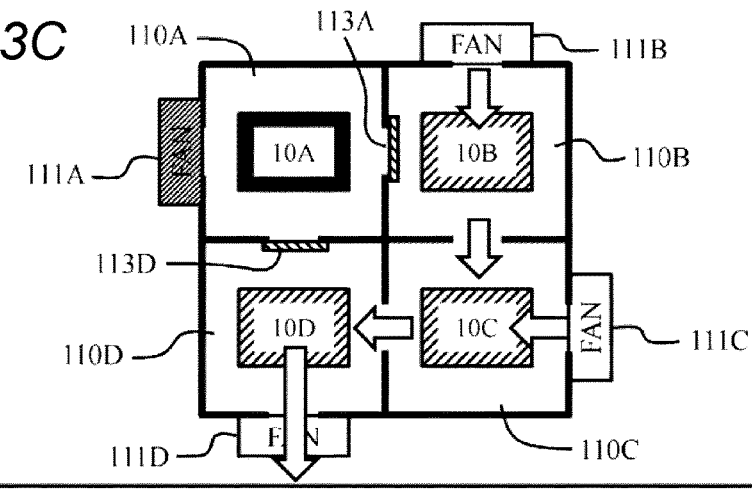

An example of a method for controlling the temperature of the deactivated battery pack 10 is described with reference to FIGS. 3A to 3C. FIGS. 3A to 3C illustrate four battery packs 10A to 10D. The battery packs 10A to 10D are provided in accommodating portions 110A to 110D, respectively. The battery packs 10A to 10D are connected to the load or the-like 2 in parallel, as illustrated in FIG. 1.

FIG. 3A illustrates a state before the deactivation of the battery pack. The accommodating portions 110A to 110D are provided with fans 111A to 111D through which air circulates. Flow of the air is illustrated with arrows. Further, the accommodating portions 110A to 110D are provided with openings 112A to 112D formed to communicate with another adjacent accommodating portion. The openings 112A to 112D are opened and closed with gates 113A to 113D (with only 113A and 113D illustrated in the drawings). In a case where the gate are opened, air circulates through the accommodating portions 110A to 110D by the fans 111A to 111D, and the accommodating portions 110A to 110D are maintained to have a constant temperature. In the state in FIG. 3A, all of the gates are opened, and adjacent accommodating portions communicate with each other.

FIG. 3B illustrates a state in which the rechargeable battery deactivation control portion 171 selects the deactivation target battery pack 10A and starts temperature control of the battery pack 10A. The rechargeable battery deactivation control portion 171 closes the gate 113A positioned on the downstream side in the flow of the air in the accommodating portion 110A which is provided with the deactivation target battery pack 10A. Further, the rechargeable battery deactivation control portion 171 stops the fan 111A attached to the accommodating portion 110A.

FIG. 3C illustrates a state in which the temperature control of the accommodating portion 110A that accommodates the deactivation target battery pack 10A is ended. The rechargeable battery deactivation control portion 171 closes the gate 113D which is not closed in FIG. 3B, of the two gates 113A and 113D corresponding to the accommodating portion 110A. Thus, the accommodating portion 110A that accommodates the deactivation target battery pack 10A is isolated from the other accommodating portions 110B to 110D. The accommodating portion 110A is isolated, and thereby the temperature in the accommodating portion 110A rises.

Specifically, air in the accommodating portion 110A is blocked from circulating, and the temperature in the accommodating portion 110A rises due to residual heat in the deactivation target battery pack 10A and heat transmitted through air or the wall portion of the accommodating portion from the other battery packs 10B to 10D. It is possible to perform air cooling of the other activating battery packs 10B to 10D by the fans 111B to 111D.

As described above, in the method for controlling the temperature illustrated in FIGS. 3A to 3C, the temperature of the deactivation target battery pack 10A is maintained within the predetermined temperature range by using the heat of the activating battery packs 10B to 10D. Hence, it is possible to realize functions of increasing and retaining a temperature at low costs without using a heater, an air conditioner, or the like.

Figure 4:
FIG. 4 is a test result table T1 of a result in a case where the deactivation is performed by changing an SOC at the time of the deactivation and a temperature during the deactivation.

FIG. 4 illustrates a test result table T1 obtained by checking a change in the direct current resistance (DCR) and capacitance maintenance rate while the temperature and the SOC of the battery pack 10 changes.

The inventors of the present application conducted a charge/discharge of the lithium-ion battery with a deactivated state interposed between the charge and discharge, and evaluated a DCR increasing rate and the capacitance maintenance ratio. The charge/discharge test was conducted under conditions in which the central SOC was 50%, a charge/discharge SOC range was 25% to 75%, and a charge/discharge current value was 1.2 C. Note that, during the charge/discharge test, the deactivation was performed for three hours every 50 cycles in the predetermined deactivation conditions (the predetermined temperature range and the predetermined SOC). The DCR increasing rate shown in the table T1 is calculated by dividing a DCR value obtained after 1,000 cycles by an initial DCR value. Similarly, the capacitance maintenance rate in the table T1 is calculated by dividing a capacitance value obtained after 1,000 cycles by an initial capacitance value.

Relationship Between Temperature and SOC Rate of Deactivated Rechargeable Battery and Charge/Discharge Characteristics Example E1 is considered that the temperature of the deactivated rechargeable battery was 30° C., the lithium ions were diffused in electrodes during the deactivation and were evenly dispersed, and thus the DCR increasing rate was decreased to 129%. Note that Example E1 is considered that the SOC during the deactivation was relatively low to be 50%, and thus the capacitance maintenance rate was maintained to be 91%.

In Example E2, the temperature of the deactivated rechargeable battery was 30° C., similar to Example E1. On the other hand, Example E2 is considered that, since the SOC during the deactivation was low to be 30% and the battery was deactivated in a state in which the battery is chemically more stable, the DCR increasing rate was lowered to be 126% and the capacitance maintenance rate was maintained to be 94%.

Example E3 is considered that the temperature of the deactivated rechargeable battery was 40° C., the diffusion of the lithium ions were more promoted than in Examples E1 and E2, and thus the DCR increasing rate was decreased to 125%.

In Example E4, the temperature of the deactivated rechargeable battery was 40° C. On the other hand, Example E4 is considered that, since the SOC during the deactivation was low to be 30% and the battery was deactivated in a state in which the battery is chemically more stable, the DCR increasing rate was lowered to be 123% and the capacitance maintenance rate was maintained to be 92%.

On the other hand, a lithium-ion battery of Comparative Example C1 has a high temperature of 50° C. of the deactivated rechargeable battery and a high SOC of 70% during the deactivation, compared to the lithium-ion batteries of Examples E1 to E4. Therefore, in Comparative Example C1, the DCR increasing rate is high to be 147% and the capacitance maintenance rate is low to be 83%.

As the temperature of the rechargeable battery increases, the diffusion of the lithium ions is promoted. On the other hand, in a case where the temperature is out of the predetermined temperature range (for example, 25% to 40%), and further the SOC during the deactivation exceeds the predetermined SOC, a side reaction between the electrolyte and the lithium ions progresses during the deactivation. Therefore, an increase in the DCR and a decrease in the capacitance are considered to be brought about.

In Comparative Example C2, since the SOC during the deactivation is low to be 30%, but the temperature of the deactivated rechargeable battery is high to be 50° C., the DCR increasing rate increases to be 135%.

In Comparative Example C3, since the temperature of the deactivated rechargeable battery is 30° C., the diffusion of the lithium ions are promoted. However, in Comparative Example C3, since the SOC during the deactivation is high to be 70%, the DCR increasing rate increases to be 132%. In a case where the SOC is high to exceed 60%, many lithium ions are gathered at a negative electrode and a reaction with the electrolyte progresses.

In Comparative Example C4, since the SOC during the deactivation is low to be 30%, but the temperature of the deactivated rechargeable battery is low to be 10° C., the diffusion of the lithium ions is not be promoted during the deactivation. As a result, in Comparative Example C4, the DCR increasing rate increases to be 132%.

in Comparative Example C5, since the temperature of the deactivated rechargeable battery is low to be 10° C. and the SOC during the deactivation is high to be 70%, the diffusion of the lithium ions is not performed and a reaction between the electrolyte and the lithium ions occurs. As a result, in Comparative Example C5, the DCR increasing rate increases to be 142%, and the capacitance maintenance rate is lowered to be 87%.

Based on the results shown in the test result table T1, in the example, with a slight margin, the SOC at the time of the deactivation is set to be 60% or lower, and the temperature of the deactivated battery pack 10 is maintained within a range of 25° C. to 40° C.

Example 2

The second example is described with reference to FIG. 5. Since the following examples including the example correspond to modification examples of the first example, a difference from the first example is mainly described. In the example, the battery pack 10 is deactivated such that an activation rate of the electricity storage system 1 is equal to or higher than a predetermined activation ratio.

Figure 5:
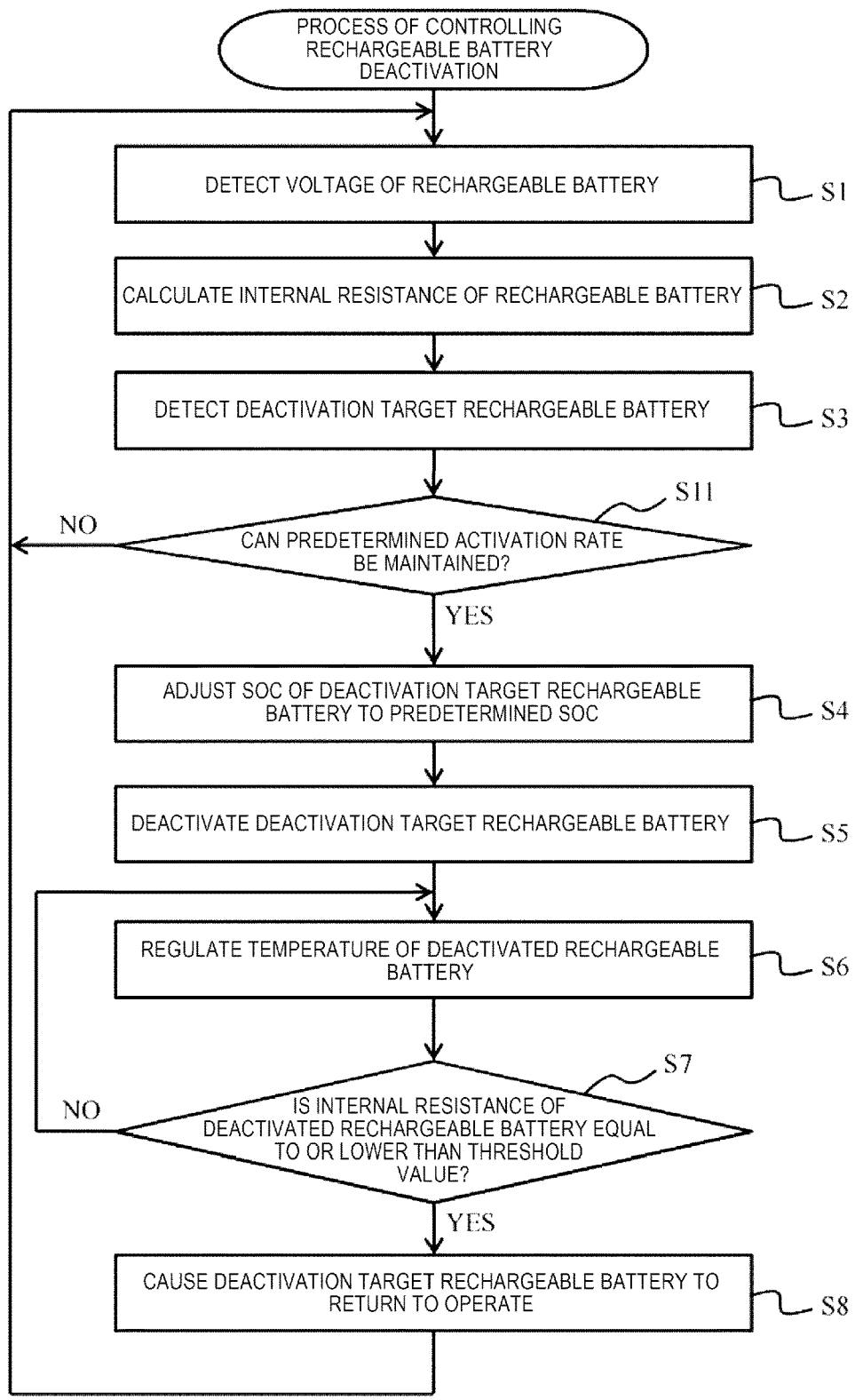
FIG. 5 is a flowchart illustrating a process of controlling deactivation of a rechargeable battery according to a second example.

FIG. 5 is a flowchart illustrating a process of controlling deactivation of the rechargeable battery according to the example. The process has all of Steps S1 to S8 included in the process described in FIG. 2. Further, the process has new Step S11 executed between Step S3 and Step S4. Here, the new Step S11 is described.

When the rechargeable battery deactivation control portion 171 detects the deactivation target battery pack from the battery packs 10 (S3), the rechargeable battery deactivation control portion determines whether the activation rate obtained in the case where the deactivation target battery packs 10 are deactivated is equal to or higher than the predetermined activation rate (S11). Here, the activation rate is a percentage of the battery packs in which charge or discharge is performed (that is, battery packs which are not deactivated) to the battery packs 10 included in the electricity storage system 1 (activation rate=the number of activating battery packs/the number of all battery packs). In the example, for example, the predetermined activation rate is set to be 75%.

Even in a case where the rechargeable battery deactivation control portion 171 deactivates the deactivation target battery pack 10 detected in Step S3, the rechargeable battery deactivation control portion determines that the activation rate of the electricity storage system 1 can be maintained to be the predetermined activation rate (YES in S11), and Steps S4 to S8 are executed. In this manner, as described in the first example, the deactivation target battery pack 10 is deactivated in the predetermined conditions, and the lithium ions are diffused such that the performance is recovered.

On the other hand, when the rechargeable battery deactivation control portion 171 deactivates the deactivation target battery pack 10, the rechargeable battery deactivation control portion determines that it is not possible to maintain the predetermined activation rate (NO in S11), and the process returns to Step S1. The process is simply described; however, it is possible to execute processes (S7 and S8) in which the deactivated battery pack 10 is again connected to the electricity storage system 1 and returns to operate, along with the processes (S1 to S6) in which the detection target battery pack 10 is detected and deactivated. For example, when the deactivated battery pack 10 returns to operate in the electricity storage system 1 and the activation rate increases, it is possible to deactivate the battery pack 10 which is determined to be NO in Step S11.

The example having such a configuration also achieves the same function effects as the first example. Further, in the example, while the predetermined activation rate is maintained, it is possible to deactivate the deactivation target battery pack 10 such that it is possible to recover the performance thereof. Hence, in the example, it is possible to improve the performance and the service life of the battery pack and it is also possible to increase the activation ratio. As a result, in the example, it is possible to further reduce introduction costs and operation costs of the electricity storage system 1, and it is possible to maintain the performance and reliability.

Example 3

The third example is described with reference to FIG. 6. In the example, the deactivation target battery pack 10 is not immediately deactivated, but is used as it is, and is deactivated in a case where the SOC thereof becomes the predetermined SOC.

Figure 6:
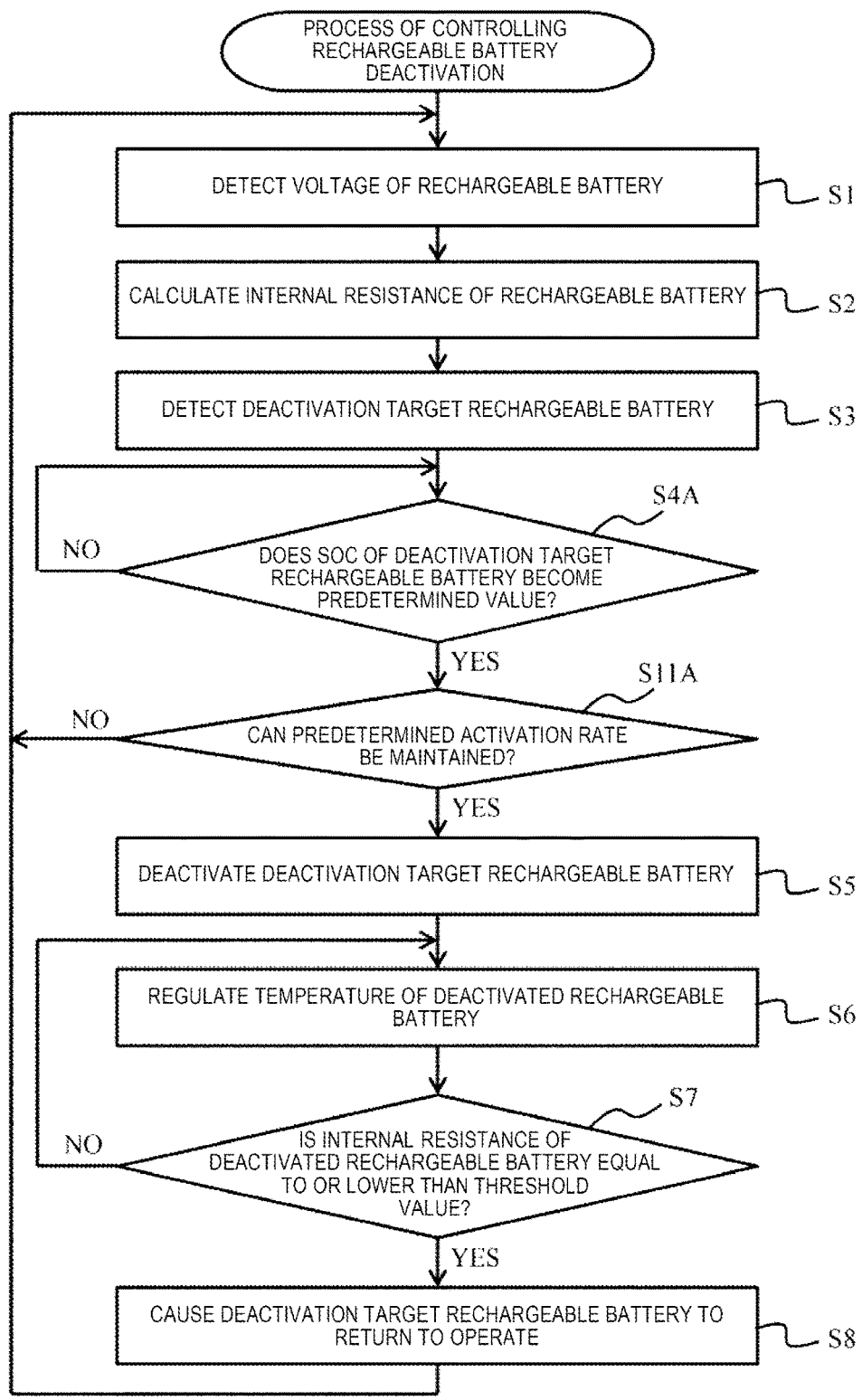
FIG. 6 is a flowchart illustrating a process of controlling deactivation of a rechargeable battery according to a third example.

FIG. 6 is a flowchart illustrating a process of controlling deactivation of the rechargeable battery according to the example. The process has Steps S1 to S3 and S5 to S8 included in the process described in FIG. 2. The example differs from the first example in that the process has Step S4A in which the SOC of the deactivation target battery pack 10 is lowered to the predetermined SOC. Further, the example differs from the first example in that Step S11A, in which determination of whether it is possible to maintain the predetermined activation rate described in FIG. 5 is executed at a different timing.

When the rechargeable battery deactivation control portion 171 detects the deactivation target battery pack 10 (S3), the rechargeable battery deactivation control portion charges or discharges the deactivation target battery pack 10, thereby waiting until the SOC of the deactivation target battery pack 10 becomes the predetermined SOC (S4A). In other words, while the rechargeable battery deactivation control portion 171 continues to use the deactivation target battery pack 10, the rechargeable battery deactivation control portion waits until the conditions (deactivation conditions), in which the deactivation is performed, are satisfied (S4A). For example, in a case where the SOC of the deactivation target battery pack 10 exceeds 60%, the rechargeable battery deactivation control portion 171 causes the deactivation target battery pack 10 to be connected to the load 2A and to be discharged, and waits until the SOC is equal to or lower than 60%.

When the rechargeable battery deactivation control portion 171 checks that the SOC of the deactivation target battery pack 10 becomes the predetermined SOC (YES in S4A), the rechargeable battery deactivation control portion determines whether it is possible to maintain the predetermined activation rate even in the case where the deactivation target battery pack 10 is deactivated (S11A). When the rechargeable battery deactivation control portion 171 determines that it is possible to maintain the predetermined activation rate (YES in S11A), Step S5 to S8 are executed.

The example having such a configuration also achieves the same function effects as the first and second examples. Further, in the example, in the case where the deactivation target battery pack 10 is detected, the battery pack continues to be used as it is until the SOC becomes the predetermined SOC. Therefore, it is possible to further improve the activation rate of the battery pack 10.

Example 4

Figure 7:
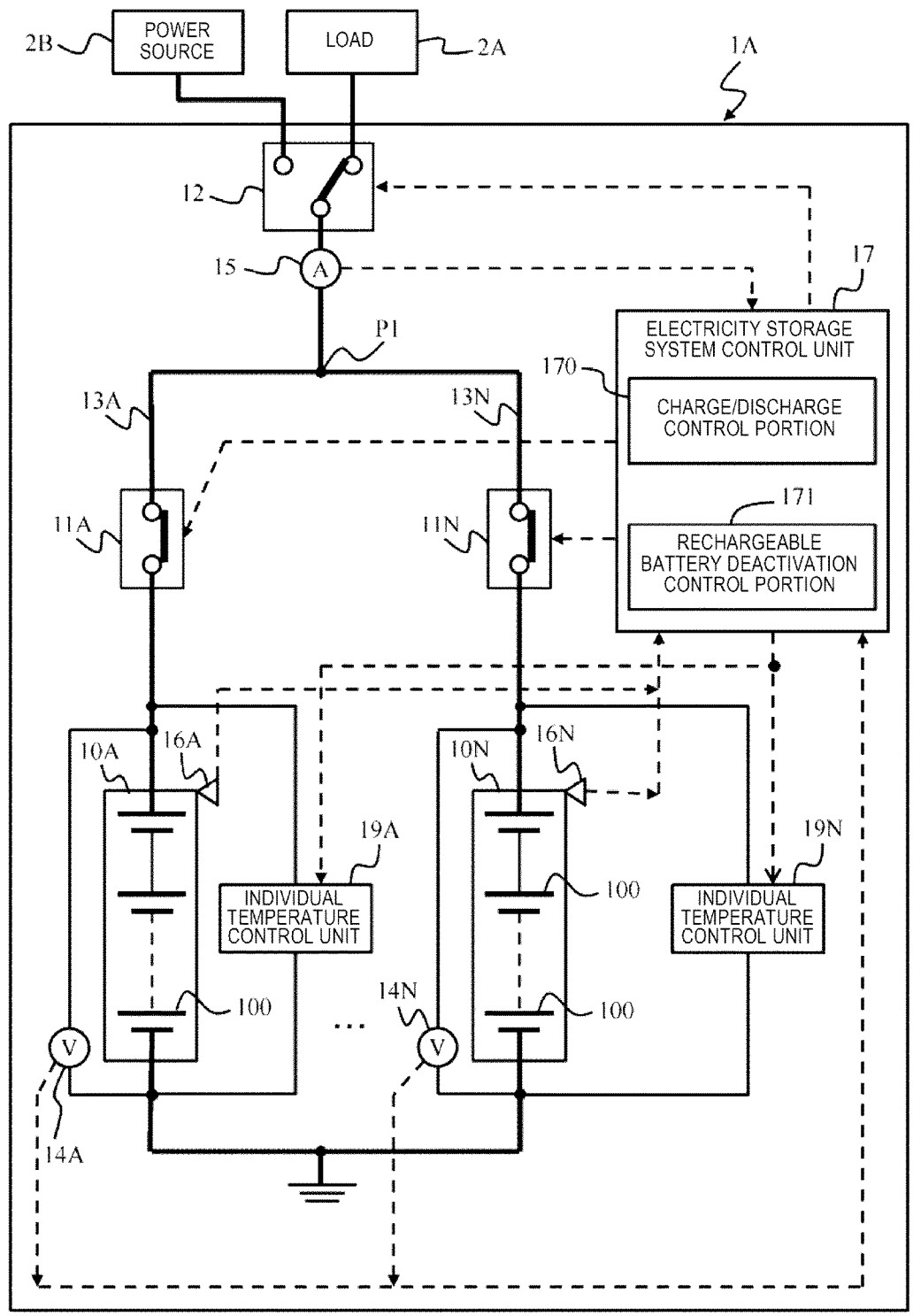
FIG. 7 is a diagram illustrating an entire configuration of an electricity storage system according to a fourth example.

The fourth example is described with reference to FIG. 7. In the example, individual temperature control portions 19A to 19N (hereinafter, referred to as an individual temperature control portion 19) for regulating individually the temperatures of the battery packs 10 are provided. FIG. 7 illustrates two battery packs 10, for convenience.

The battery packs 10 are provided with the individual temperature control portions 19, respectively. The individual temperature control portion 19 has, for example, a heating function, a cooling function, a heat retention function, or the like, and regulates the temperature of the corresponding battery pack 10 on the basis of the instruction from the rechargeable battery deactivation control portion 171.

The example having such a configuration also achieves the same function effects as the first example. According to the example, it is possible to combine and use the second and third examples.

Note that the invention is not limited to the embodiment described above. It is possible for those skilled in the art to perform various additions, modifications, or the like within the range of the invention. In the embodiment described above, the invention is not limited to the configurational examples illustrated in the accompanying figures. It is possible to appropriately modify the configuration or the method for the process of the embodiment within the range in which the object of the invention is achieved.

In addition, it is possible to arbitrarily select components of the invention, and the invention includes an invention including a selected configuration. It is possible to combine configurations described in the claims, in addition to combinations described in claims.

What is claimed is:

1. An electricity storage system comprising:
    a plurality of rechargeable batteries connected in parallel; and
    a control unit that controls the rechargeable batteries, wherein the control unit
        detects a deactivation target rechargeable battery of which charge or discharge need to be deactivated, of the rechargeable batteries,
        electrically separates and deactivates the deactivation target rechargeable battery from a load in a case where a charging rate of the deactivation target rechargeable battery is lower than a predetermined charging rate, and
        performs control such that a temperature of the deactivated rechargeable battery is within a predetermined temperature range;
    wherein the control unit deactivates the deactivation target rechargeable battery in a case where an activation rate indicating a percentage of rechargeable batteries, in which charge or discharge is performed, to the rechargeable batteries is higher than a predetermined activation rate.

2. The electricity storage system according to claim 1, wherein the control unit detects, as the deactivation target rechargeable battery, a rechargeable battery having a temperature higher than an average temperature of the other rechargeable batteries of the rechargeable batteries.

3. The electricity storage system according to claim 2, wherein the predetermined charging rate is 60%.

4. The electricity storage system according to claim 3, wherein the predetermined temperature range is a range of 25° C. to 40° C.

5. The electricity storage system according to claim 1, wherein the rechargeable batteries are provided with temperature control units that control temperatures individually, respectively, and
wherein the control unit performs control such that the temperature of the deactivated rechargeable battery is within the predetermined temperature range via the temperature control unit provided to the deactivated rechargeable battery.

6. The electricity storage system according to claim 1, wherein the control unit detects direct current resistances of the rechargeable batteries and detects, as the deactivation target rechargeable battery, a rechargeable battery having a direct current resistance higher than a predetermined direct current resistance.

7. The electricity storage system according to claim 1, wherein the rechargeable batteries are lithium-ion batteries.

8. An electricity storage system comprising:
a plurality of rechargeable batteries connected in parallel; and
a control unit that controls the rechargeable batteries,
wherein the control unit
    detects a deactivation target rechargeable battery of which charge or discharge need to be deactivated, of the rechargeable batteries,
    electrically separates and deactivates the deactivation target rechargeable battery from a load in a case where a charging rate of the deactivation target rechargeable battery is lower than a predetermined charging rate, and
    performs control such that a temperature of the deactivated rechargeable battery is within a predetermined temperature range;
    wherein the control unit deactivates the deactivation target rechargeable battery in a case where an activation rate indicating a percentage of rechargeable batteries, in which charge or discharge is performed, to the rechargeable batteries is higher than a predetermined activation rate; and
    wherein the control unit controls the temperature of the deactivated rechargeable battery to be within the predetermined temperature range by using heat generated by a predetermined rechargeable battery of the rechargeable batteries.

9. The electricity storage system according to claim 8, wherein the predetermined rechargeable battery is another rechargeable battery apart from the deactivated rechargeable battery.

10. A method for controlling an electricity storage system that includes
a plurality of rechargeable batteries connected in parallel, and
a control unit that controls the rechargeable batteries,
the method comprising:
detecting, by the control unit, a deactivation target rechargeable battery of which charge or discharge need to be deactivated, of the rechargeable batteries,
electrically separating and deactivating the deactivation target rechargeable battery from a load in a case where a charging rate of the deactivation target rechargeable battery is lower than a predetermined charging rate, and
performing control such that a temperature of the deactivated rechargeable battery is within a predetermined temperature range;
wherein the control unit deactivates the deactivation target rechargeable battery in a case where an activation rate indicating a percentage of rechargeable batteries, in which charge or discharge is performed, to the rechargeable batteries is higher than a predetermined activation rate.

* * * * *